United States Patent
Hauck et al.

(10) Patent No.: US 6,912,669 B2
(45) Date of Patent: Jun. 28, 2005

(54) METHOD AND APPARATUS FOR MAINTAINING CACHE COHERENCY IN A STORAGE SYSTEM

(75) Inventors: Edward Lewis Hauck, Niwot, CO (US); Brian Dennis McKean, Longmont, CO (US); Noel Simen Otterness, Lafayette, CO (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 10/080,397

(22) Filed: Feb. 21, 2002

(65) Prior Publication Data

US 2003/0158999 A1 Aug. 21, 2003

(51) Int. Cl.[7] ............................................. G06F 12/16
(52) U.S. Cl. ..................... 714/6; 711/113; 711/144; 711/145; 711/143; 711/162; 711/165; 711/135
(58) Field of Search ................................ 711/113, 144, 711/145, 143, 162, 165, 133, 135; 714/6

(56) References Cited

U.S. PATENT DOCUMENTS

| | | | |
|---|---|---|---|
| 5,588,110 A | * 12/1996 | DeKoning et al. | ............. 714/5 |
| 5,748,879 A | 5/1998 | Kobayashi | .................... 714/42 |
| 5,761,705 A | 6/1998 | DeKoning et al. | .......... 711/113 |
| 5,802,561 A | 9/1998 | Fava et al. | .................. 711/120 |
| 5,809,543 A | 9/1998 | Byers et al. | ................. 711/162 |
| 6,202,115 B1 | 3/2001 | Khosrowpour | .............. 710/129 |
| 6,247,099 B1 | * 6/2001 | Skazinski et al. | ............ 711/141 |
| 6,574,709 B1 | * 6/2003 | Skazinski et al. | ........... 711/119 |

* cited by examiner

Primary Examiner—Reginald G. Bragdon
(74) Attorney, Agent, or Firm—Crawford Maunu PLLC

(57) ABSTRACT

A method and apparatus for cache coherency in storage system is disclosed. The invention maintains cache coherency in the controller system of the storage system in a manner to minimize the performance degradation to a host system, and to allow the caches to be coherent without requiring data to be written to the backing disks. Each controller manages an area of memory on the partner controller, but the area is managed dynamically and is done with the information about the partner controller. A first controller determines which mirror cache line on a second controller to copy data into, and then mirrors the data from a first controller cache line to a second controller cache line. A message is sent from the first controller to the second controller informing the second controller of cache meta data associated with the mirror cache line so that the cache line may be added to the second controller's hash table.

22 Claims, 8 Drawing Sheets

PRIOR ART

METHOD AND APPARATUS FOR MAINTAINING CACHE COHERENCY IN A STORAGE SYSTEM

BACKGROUND OF THE INVENTION

1. Field of the Invention

The present invention relates to data storage system, and more particularly, to maintaining cache coherency in a storage system in a manner to minimize the performance degradation to a host system.

2. Description of the Related Art

Magnetic hard disks are the principal technology employed for secondary memory systems in computers. While providing large amounts of storage at low cost per bit, disk memories have several drawbacks: they have relatively slow data-transfer rates, and their electromechanical construction makes them prone to both transient and catastrophic failures. However, these modern mass storage subsystems continue to provide increasing storage capacities to fulfill user demands for host computers system applications. Thus, due to critical reliance on large capacity mass storage, various redundant configurations are commonly used.

For example, one type of reliable mass storage configuration is a RAID system. The RAID is a disk array structure that connects several disks together to extend the cost, power, and space advantages of small disks to higher-capacity configurations. In RAID systems, data files and related parity are striped (a large logical block of data divided into multiple physical blocks) across multiple disk drives. In storage subsystems, which manage numerous hard disk drives as a single direct access storage device (DASD), the RAID system logic is implemented in the controller of the subsystem. RAID system storage methodologies have also been implemented in software for execution on a single host computer. This allows the single host computer, such as a personal computer, to implement RAID system storage techniques on local hard disk drive space.

One problem with the single storage subsystem is the risk of failure. Techniques have been developed to improve failback and recovery in case of failures in the hardware controller. One such failback technique is the Fast Write Technique, which provides two separate controllers on different power boundaries that control the flow of data from host systems to DASDs. If one controller fails, the other controller can continue writing data to the DASD. Typically a non-volatile storage unit (NVS) is included with each separate controller, such that each NVS connected to a controller backs up the data the other controller is writing to DASD.

RAID systems can also be implemented in a parallel computing architecture in which there is no central controller. A plurality of independent controllers, which control local hard disk storage devices, are separate nodes that function together in parallel to implement RAID system storage methodologies across the combined storage space managed by each node. The nodes are connected via a network. Parity calculations can be made at each node, and not centrally.

In addition to RAID systems, there is an increasing need to provide access to stored information or data on hard disk drives (or other storage devices) from a plurality of host servers and to also permit the data stored on any particular storage device to be accessed through alternative device controllers. Providing access to the data from multiple hosts eliminates the need to store the data at more than one location (though the data may still be redundantly stored using known mirroring or Redundant Array of Independent Disk (RAID) techniques) and in theory assures that the identical data can be accessed by interested parties. Providing accesses to a storage device through multiple controllers provides redundant access to the device from an alternate (or second) controller so that the data remains accessible in the event that the first controller fails. A distributed computing system is one example of such a system.

A distributed computing system generally comprises three types of components: workstations, hosts, and storage media. The storage media are used to store data required by the system. A storage medium may include magnetic disk drives, banks of memory chips, or the like. A host is a computer, such as a server, that executes applications for, and exchanges data with, one or more users. Hosts generally also provide users with access to the storage media. A user generally accesses the hosts via a workstation, which can be a personal computer or the like. In a distributed computing system, as in other computing systems, a key performance consideration is the speed of operation. A common obstacle to speed is the delay involved in transferring data to and from storage media. In a distributed computing system, the storage media may not be located near the host, and so this delay is magnified.

As can be appreciated in all of these storage systems, the response time of the storage system is greatly enhanced by the use of cache memory. As is well known, a cache memory stores frequently accessed data word units in cache memory as well as in primary memory. However, the storage system must maintain data coherence between the word unit in cache and the same word unit in primary storage.

There are two strategies for maintaining word unit coherence—write-through cache and write-back cache. In a write-through cache, the processor writes the modified word unit to both the cache and primary memory to ensure that both memories always have updated copies of the word unit. This is the simplest and most commonly used method. In write-back cache, the cache controller keeps track of which word units in the cache have been modified by the processor. Marking the modified word units with a dirty bit accomplishes this tracking of modified word units. Thereafter, when word units are displaced from the cache, the word units with a dirty bit are written to primary memory.

To increase the reliability of cache write-back storage, storage systems have written word units twice, once each at two separate cache memories. Accordingly, if one cache memory fails, the word unit is preserved in the second cache memory. This is referred to as a mirror write.

More particularly, at boot time the controllers partition the cache into two segments, a Read/Write segment and a Copy segment. The Copy segment is managed by a partner controller as a place to store the mirror of host write data to protect against a controller failure. Initially, the Copy segment is setup to occupy approximately thirty percent of the available cache space. Accordingly, each controller manages the Copy segment as a pool of copy cache lines. Currently, a write to a first controller, which is mirrored to a second controller, requires several additional steps to insure that the data is coherent between the two controllers.

The above procedure is efficient if the writes take place only through one controller, for example the first controller. However, a problem occurs when a write to a partner controller occurs a short time later, for example a write to the second controller. Accordingly, prior to the write being accepted by the second controller, the data on the first controller must be flushed to disk. This requires coordination between the controllers through various messaging. Each message takes time and system resources which degrade the systems overall I/O performance.

Currently, the controllers take ownership of a portion of their partner's cache (mirrored cache), which is managed without any coordination with the partner. However, the partner controller does not have any information about the contents of this mirrored cache area until a failover takes place. During failover, information directed to the failed controller is rerouted, or failed over, to a partner controller, wherein the partner controller now becomes aware of the contents of the mirrored cache area. In addition, the coherency model that is currently implemented is based upon coherency at the disks instead of coherency in the caches. Since the disk access time is much slower than the access time for the cache memory, it means that the coherency technique is slower than it would be if it all took place in memory.

It can be seen that there is a need to maintain cache coherency in a storage system in a manner to minimize the performance degradation to a host system.

It can be seen that there is a need to minimize messages required to manage a coherent cache and to avoid disk flushing, accelerating cache coherency.

SUMMARY OF THE INVENTION

To overcome the limitations in the prior art described above, and to overcome other limitations that will become apparent upon reading and understanding the present specification, the present invention maintains cache coherency in storage systems.

The present invention solves the above-described problems requiring each controller to have certain information about the contents of another controller's memory, and thus, minimizes the number of messages required to manage a coherent cache and further eliminates the need to flush data to backing disks. Further, the present invention allows the caches to be write coherent without the need to synchronize data on the disks.

A method according to the present invention includes selecting a mirror cache line in a second controller to copy data into, mirroring the data from a cache line in a first controller to the mirror cache one in the second controller, and sending a message from the first controller to the second controller informing the second controller of cache meta data associated with the mirrored cache line.

In another embodiment of the invention, a controller system for maintaining cache coherency is disclosed. The controller system includes a disk array, a first controller, coupled to the disk array, for selecting a mirror cache line on a second controller and an interface for mirroring the data from a first controller cache line to the second controller cache line, wherein a message is sent from the first controller to the second controller informing the second controller about cache meta data associated with the mirror cache line.

In another embodiment of the invention, an article of manufacture comprising a program storage medium readable by a computer is disclosed. The medium tangibly embodies one or more programs of instructions executable by the computer to perform a method for maintaining cache coherency, the method includes selecting a mirror cache line in a second controller to copy data into, mirroring the data from a cache line in a first controller to the mirror cache line in the second controller and sending a message from the first controller to the second controller informing the second controller of cache meta data associated with the mirror cache line.

In another embodiment of the invention, a storage system for maintaining cache coherency is disclosed. The storage system includes means for selecting a mirror cache line in a second controller to copy data into, means for mirroring the data from a cache line in a first controller to the mirror cache line in the second controller and means for sending a message from the first controller to the second controller informing the second controller of cache meta data associated with the mirror cache line.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the exemplary embodiment, reference is made to the accompanying drawings, which form a part hereof, and in which is shown by way of illustration a specific embodiment in which the invention may be practiced. It is to be understood that other embodiments may be utilized as structural changes may be made without departing from the scope of the present invention.

The present invention maintains cache coherency in a storage system in a manner to minimize the performance degradation to a host system, and to allow the caches to be coherent without requiring data to be written (flushed) to the backing disks. Further, the present invention reduces the amount of messaging necessary to maintain cache coherency. The data storage system is merely one embodiment of the invention and the present invention is applicable to any storage system having or needing cache coherency.

The present invention allows caches to be written coherently without the need to synchronize the data on the disks.

To allow the caches to be coherent without requiring data to be written to the backing disks, each controller has certain information about what is present in another controller's memory, e.g., a partner controller. This method also precludes the use of a mirror area, which is managed only by a partner controller. Thus, each controller manages an area of memory on the partner controller, but the area is managed dynamically and is done with the information about the partner controller.

Figure 1:
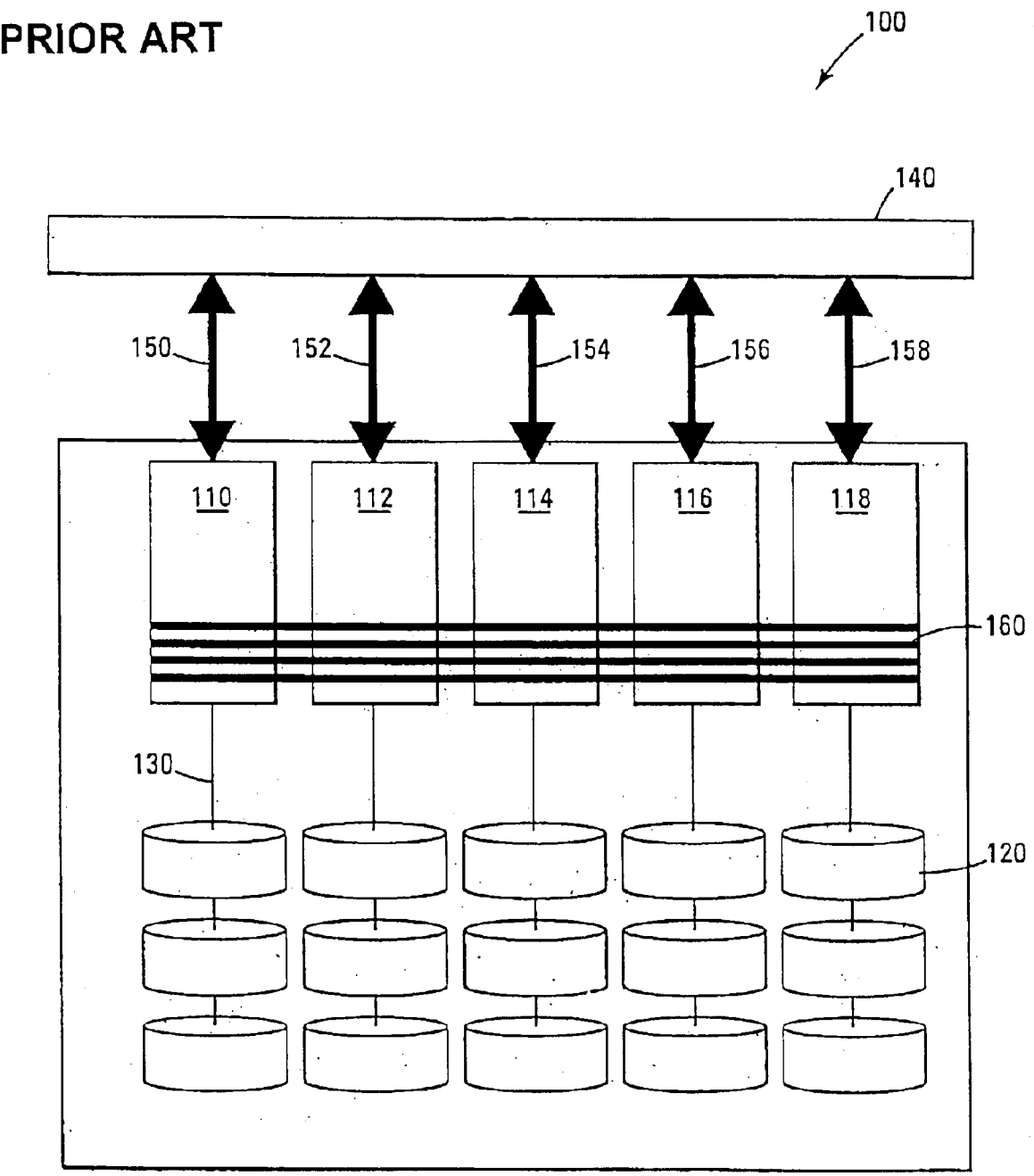
FIG. 1 illustrates a disk storage array.

FIG. 1 illustrates a disk array architecture 100. FIG. 1 shows a set of array controllers 110–118, one or more disks 120, and multiple disk interfaces 130. Controllers 110–118 interface to the host 140 via host interfaces 150–158. The Controllers 110–118 also processes read and write requests, carries out parity calculations, block placement, and recovery after a disk failure. The disk interfaces 130 passes on the commands from the controllers 110–118 to the disks 120. The disk interface may, for example, be a Small Computer System Interface (SCSI). Further, a small area network 160 may connect the controllers 110–118.

The set of array controllers 110–118 provides all the functions needed for parallel operation. This parallel architecture offers several benefits such as: fault tolerance (no central controller to break), performance scalability (no central bottleneck), smooth incremental growth (by simply adding another node), and flexibility.

Figure 2:
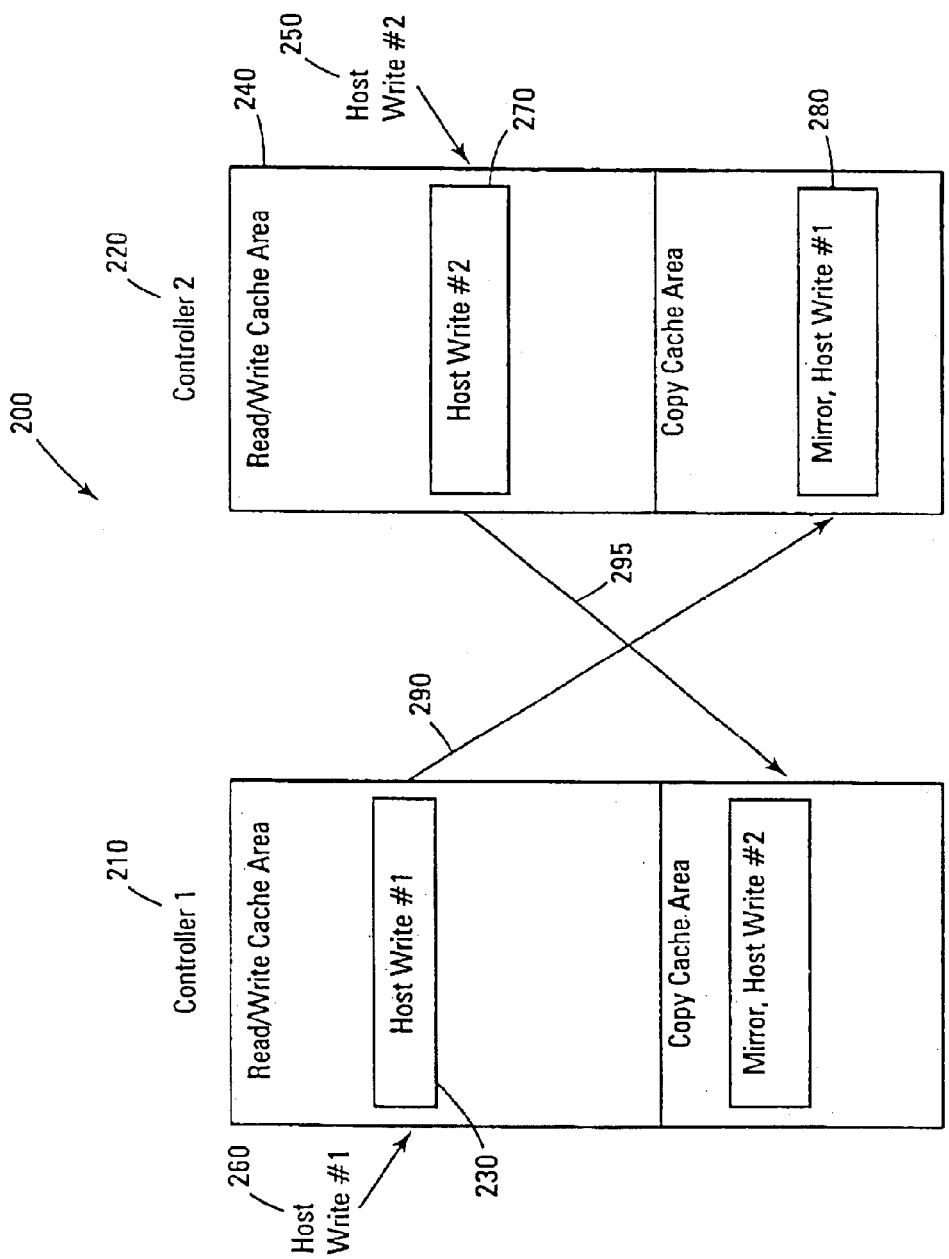
FIG. 2 is a method of storing a mirror of host write data to protect against controller failure.

FIG. 2 illustrates a method of storing a mirror of host write data to protect against controller failure 200. A write that is received at a first controller 210, is mirrored 290 to a second controller 220. Currently, this requires several additional steps to insure that the data is coherent between the two controllers. These steps include, first, prior to accepting a host write 260 on a first controller 210, the first controller 210 must insure that any data that overlaps the host write (at a cache line 230) to the first controller 210, which exists in the cache 240 of the second controller 220, needs to be flushed to a disk 120 (see FIG. 1). That is, any data in the Read/Write area that would overlap the host write 260 on the second controller 220, needs to be flushed to the disk. This is handled through various lock messages. Second, after any overlapping data on the second controller 220 is flushed to the disk, the write 230 may proceed on the first controller 210.

The first controller 210 accepts the data from the host write 260 (Host Write #1), placing the data in a cache line 230, and then determines where to mirror the data on the second controller 220. Third, a controller-to-controller mirror operation 290 commences. When the mirror operation completes, the first controller 210 can give a status to the host system (not shown) indicating that the write has completed.

As discussed above, this procedure is efficient if the writes take place through one controller, for example the first controller 210. However, a problem occurs when a write to a partner controller occurs, for example a write to the second controller 220. Thus, a problem occurs if a first host write 260, Host write #1, is executed on the first controller 210, and a second host write 250, Host Write #2, is executed the second controller 220 a short time later. Accordingly, prior to the second host write 250 being accepted by the second controller 220 at, for example, a cache line 270, the data on the first controller 210 must be flushed to disk. This requires coordination between the controllers through various messaging. Each message takes time and system resources which degrade the systems overall input/output (I/O) performance. In addition, using the disks for a synchronization point is slower than using memory within the controller.

Figure 3:
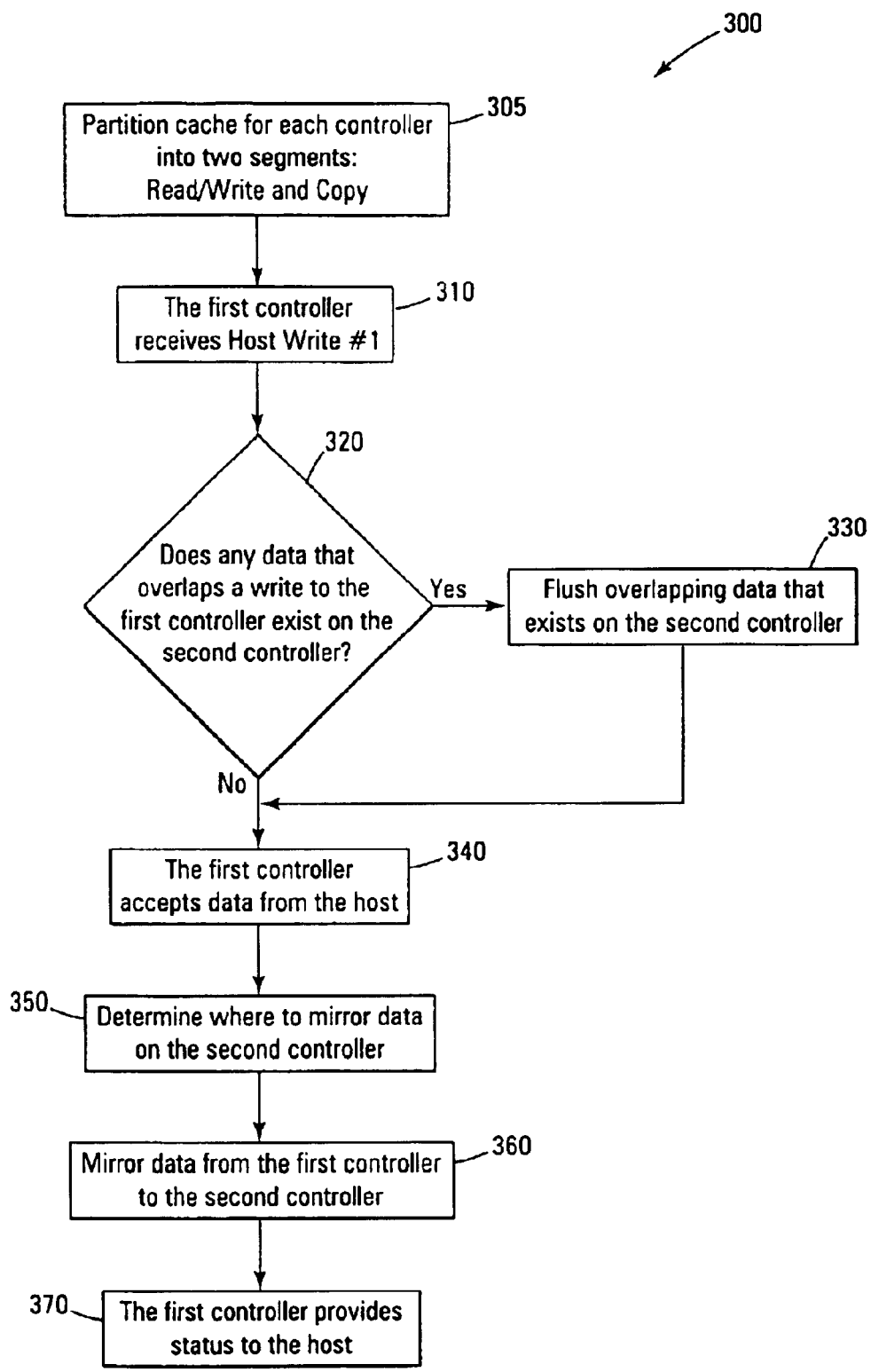
FIG. 3 is a flow chart of a method of storing the mirror of host write data as illustrated in FIG. 2.

FIG. 3 is a flow chart of a method of storing the mirror of host write data 300 as illustrated in FIG. 2. The controllers partition the cache into two segments, a Read/Write segment and a Copy segment 305. Next, prior to accepting a write on the first controller, a determination is made to insure that any data, which overlaps the write to first controller, which exists in the second controller's cache, needs to be flushed to disk 320. If there is overlapping data on the second controller, the data is flushed to a disk 330. The first controller will then accept data from the host 340 and determine where to mirror that data on the second controller 350. The controller-to-controller mirroring of data in performed 360 and the first controller provides status of the data transfer to the host 370.

Figure 4:
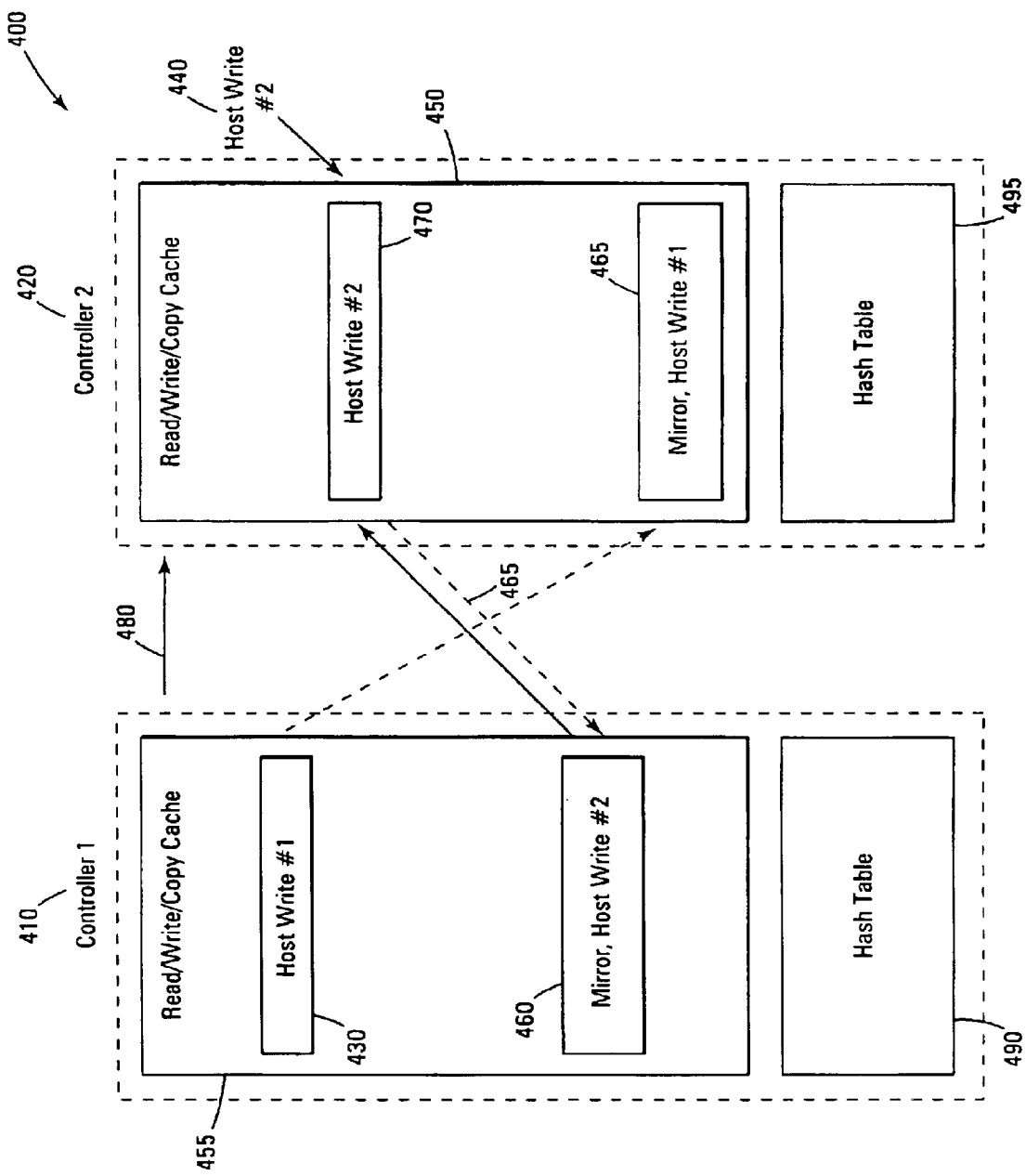
FIG. 4 illustrates maintaining cache coherency according to the present invention.

FIG. 4 illustrates maintaining cache coherency 400 according to one embodiment of the present invention. FIG. 4 illustrates a method to avoid the disk flush and additional messages required to manage a coherent cache. This technique allows the caches 450, 455 to be read/write coherent without needing to synchronize the data on the disks 120 (see FIG. 1). In some designs, cache coherency assumes a primary path for I/O, host interface path 150, and a failover path for I/O, e.g., host interface path 152, to allow the design to work properly. However, according to one embodiment of the present invention, that restriction is removed and a host is allowed to perform I/O through either path 150, 152 with minimal performance degradation. For example, a primary host path 150 and a secondary host path 152 connected to its respective controllers (e.g., between a first controller 110 and a second controller 112, respectively) operate with minimal performance degradation.

To allow the caches to be coherent without requiring data to be written to the backing disks 120 requires that each controller, for example, a first controller 410 and a second controller 420, each having a certain amount of information about what is present in its partner's memory 450, 455, respectively. This also precludes the use of a mirror area 460, 465, which is managed only by the partner controller. However, the present invention is not limited to a two controller configuration.

Each controller 410, 420 still manages an area in memory 450, 455, respectively, on its partner controller 420, 410, respectively, but the area, which is managed, is dynamic and is done with information about the partner controller 420, 410, respectively. Each controller 410, 420 still manages a free list of mirror locations in a memory location of cache lines (not shown) into which it can copy write data into the partner controller 420, 410, respectively. As will be discussed further below, after the data is copied into a cache line, the partner is informed of the new data so that the cache line may be added to the partners hash table 495, 490, respectively.

In one embodiment of the present invention, a second host write 440, Host Write #2, is sent from the host 140 (see FIG. 1) to the second controller 420. The second controller 420 finds a cache line 470 on the second controller 420 to place the second host write 440. This assumes that the second host write 440 does not overlap the first host write 430.

After the completed transfer of the host write 440, the second controller determines which mirror cache line 460 on the first controller 410 to copy the data (second host write) into. Once a determination is made, the data is mirrored 468 from the second controller's cache line 470 to a mirror cache line 460 on the first controller.

Accordingly, a message 480 is sent to the first controller 410 from the second controller 420, which contains cache meta data associated with the cache line. The cache meta data includes a logical unit (LUN), a logical block (LBA), a dirty bit map, and a cache line identifier associated with the mirrored cache data. This message 480 allows the first controller 410 to place this cache line 460 into its hash table 490, and potentially into its write back queue (not shown).

Figure 5:
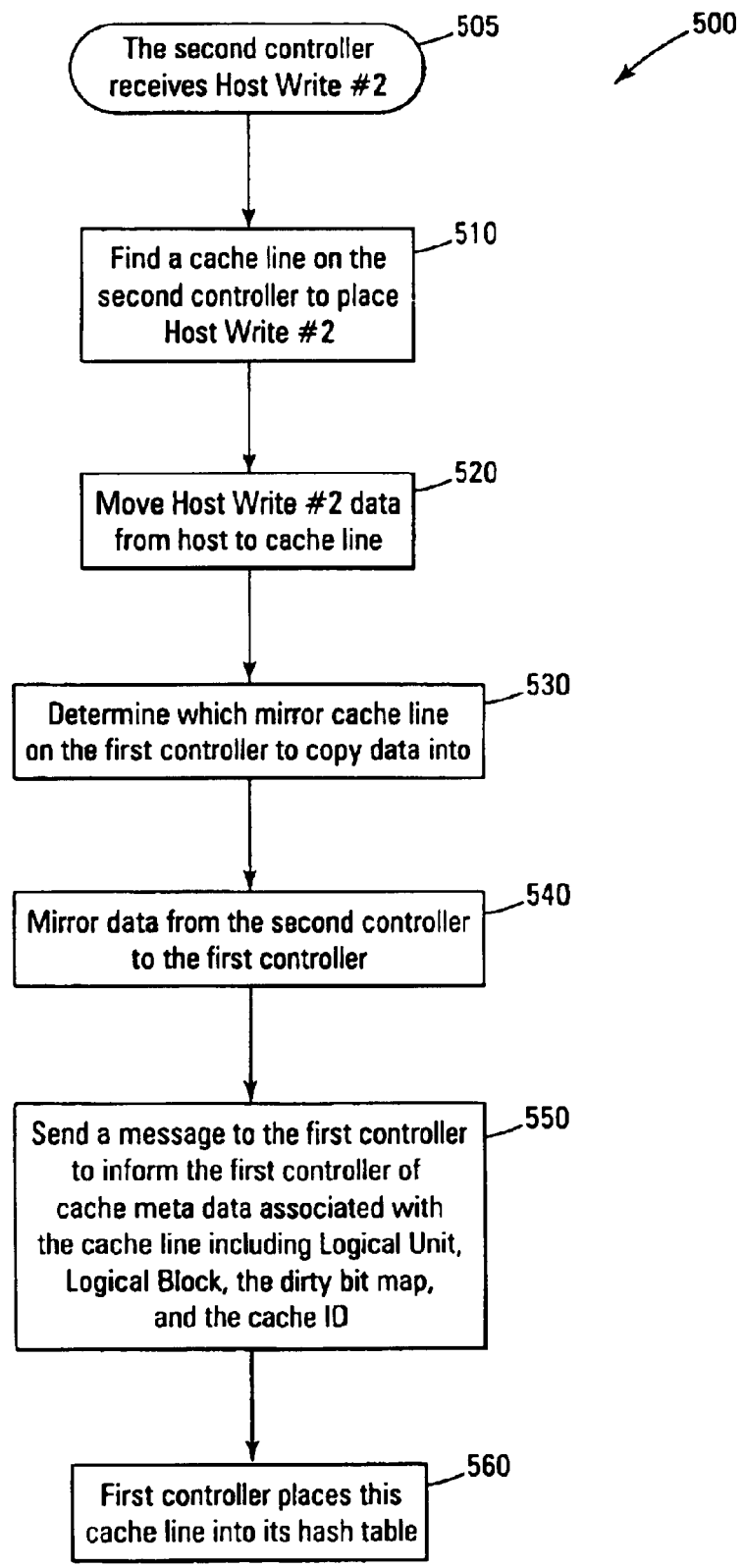
FIG. 5 is a flow chart of maintaining cache coherency as illustrated in FIG. 4, according to the present invention.

FIG. 5 is a flow chart of maintaining cache coherency 500 as illustrated in FIG. 4 according the present invention. The host sends a host write to the second controller 505. The second controller finds an available cache line in the second controller's cache to store the host write 510. A transfer of the host write from the host to the second controller is performed 520. The second controller will then determine which mirror cache line on the first controller to copy data, residing in the second controller's cache, into 530. Then, a controller-to-controller mirroring of the data is performed 540. A message is sent from the second controller to the first controller, wherein the message contains cache meta data associated with the mirrored cache line copied to the first controller. The cache meta data includes a logical unit, a logical block, a dirty bit map and the cache identification 550. The message allows the first controller to include the mirrored cache line in its hash table 560 and potentially into its write back queue.

Figure 6:
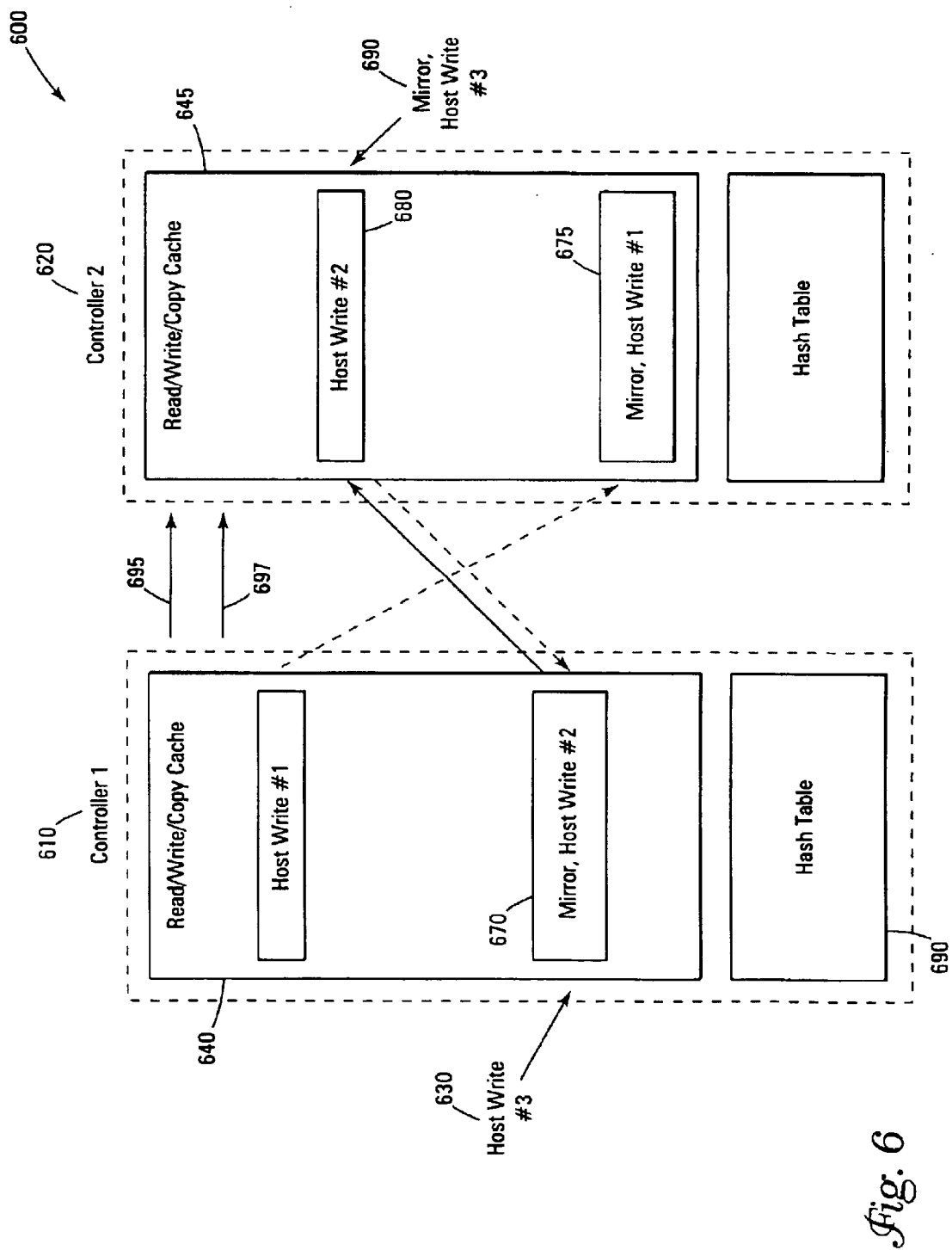
FIG. 6 illustrates the granting of ownership of a cache line and a mirrored cache line according to the present invention.

FIG. 6 illustrates the granting of ownership of a cache line and a mirrored cache line 600 according to the present invention. The advantage of the present invention can be further illustrated when a subsequent host write, a third host write (Host Write #3) 630, is sent to the first controller 610. When the third host write 630, is sent to the first controller, the mirroring of this third host write occurs in the following way. First, the first controller 610 finds a cache line 670 in the first controller's cache memory 640 to put the third host write 630 data into. Since there is a cache line 670 already registered in the hash table 690 of the first controller 610, the first controller 610 can lookup the already registered cache line 670.

A message 695 is then sent to the second controller 620, requesting ownership of the cache line 680 and the associated mirror cache line 670. Normally, the second controller 620 should be able to immediately grant ownership of the cache line 680, assuming the second controller 620 does not have any writes pending to that cache line 680. If the second controller 620 has pending writes to the cache line 680, it simply needs to complete the pending writes prior to granting ownership of the cache line 680 to the first controller 610.

After the first controller 610 gains ownership of the cache line 680, and associated mirrored cache line 670, the third host write 630 data is moved into what will now be called the cache line 670. Since the cache line 670 on the first controller 610 was the mirror of a cache line 680 on the second controller 620, the cache line 680 on the second controller can be reused as a mirror 690 of the third host write 630. Thus, there is no special type of lookup performed. The third host write 630 data is mirrored to the cache line 680 on the second controller. A message 697, which includes any updates to the cache meta data, is sent from the first controller 610 to the second controller 620 to update at least the dirty bit map in the second controller 620.

The present invention improves performance significantly if the traffic to the controllers is balanced, i.e. the writes and reads to an extent are distributed between the controllers. It will also greatly simplify the failover/failback process, since there is no need to segment the cache into Read/Write areas and Copy areas as illustrated in FIG. 2.

Three additional features may be added to the caching code. The first feature is that since the ownership of the mirror lines 670, 675 can switch between the two controllers 610, 620, a method needs to be put into place to allow the ownership of a mirror line to pass to the partner controller 620, 610, respectively. This occurs if one of the controllers 610, 620 starts too take too large a percentage of its partner's caches 645, 640, respectively, as mirror cache lines. When this takes place, the controller 610, 620, which owns a large percentage of the cache lines, will need to give them back to its partner controller 620, 610, respectively. Additional features are discussed below.

Figure 7:
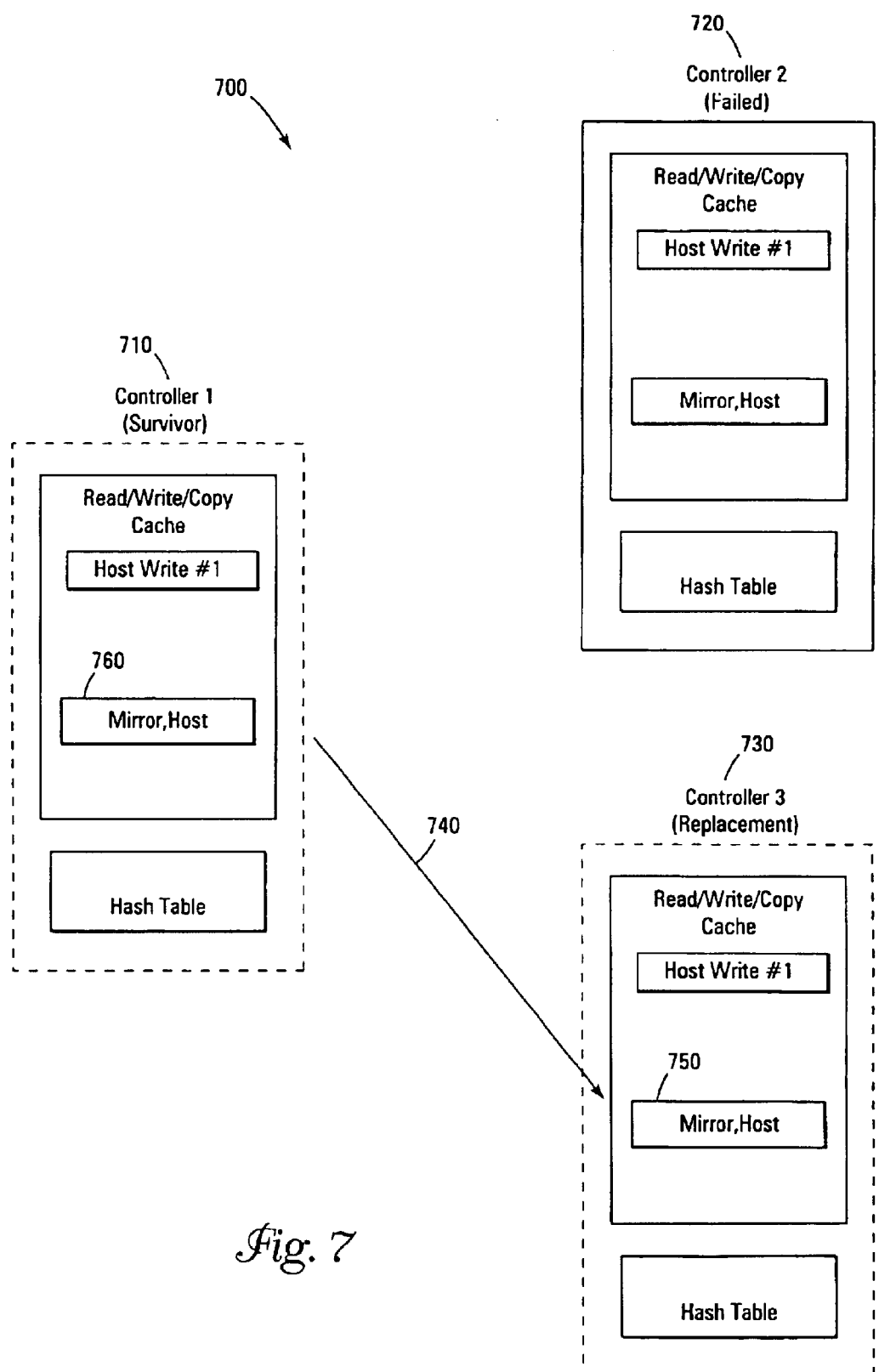
FIG. 7 illustrates the passing of cache lines to a replacement controller after a failback according to the present invention.

FIG. 7 illustrates the passing of cache lines to a replacement controller after a failback 700 according to the present invention. As discussed above, a failover occurs, for example, when a second controller 720 fails, and information from the host 140 (see FIG. 1) is rerouted through a first controller 710. When a replacement controller 730 replaces the failed controller 720, information, including available cache lines 760 that can be used for a mirroring cache line by the replacement controller 730, is sent to the replacement controller 730. That is, the survivor controller 710 simply passes back data indicating available cache lines 740 to a replacements controller 730 until the replacement controller 730 owns a sufficient number of mirror cache lines 750. Thus, the replacement controller 730 may receive a message, or another indication that mirroring cache lines 760 are available. This messaging from the survivor controller 710 to the replacement controller 730 may occur in the background, and thus, there is no need to wait for a cache flush to take place.

Another feature may be to provide a message that indicates when a cache line is cleared, the mirrored information is invalid. For example, when a cache line of the survivor controller 710 is cleared, and that cache line can be reused, the mirrored information, for example the mirrored cache line 750 on the replacement controller 730, will have invalid data. Thus, this message is needed when a cache line 760 associated with a mirror cache line 750 has been flushed and is being used for a new (and different LUN, LBA) write operation. The controller 730 of the mirror cache line 750 needs to be informed that the data it currently holds is being replaced and will be temporarily invalid.

The final feature is to allow the dirty bit maps to be cleared on the mirror cache lines. Thus, once a cache line is destaged (e.g., the first controller's cache line 760), its mirrored cache line 750 needs to know that the data the mirror cache line 750 holds is consistent with a corresponding backing disk 120 and does not need to be written in the event of a failover.

Further, an alternative to the ownership management scheme is to allow any cache line that has had its data flushed to disk to be reused by either of the two controllers 710, 730. Thus, the next controller needing a free cache line can claim ownership and reuse the "clean" cache line. In this way the controller that is busiest will be able to hold on to a larger portion of its partner's cache lines and the load on the respective controllers will determine the allocation of cache lines.

Figure 8:
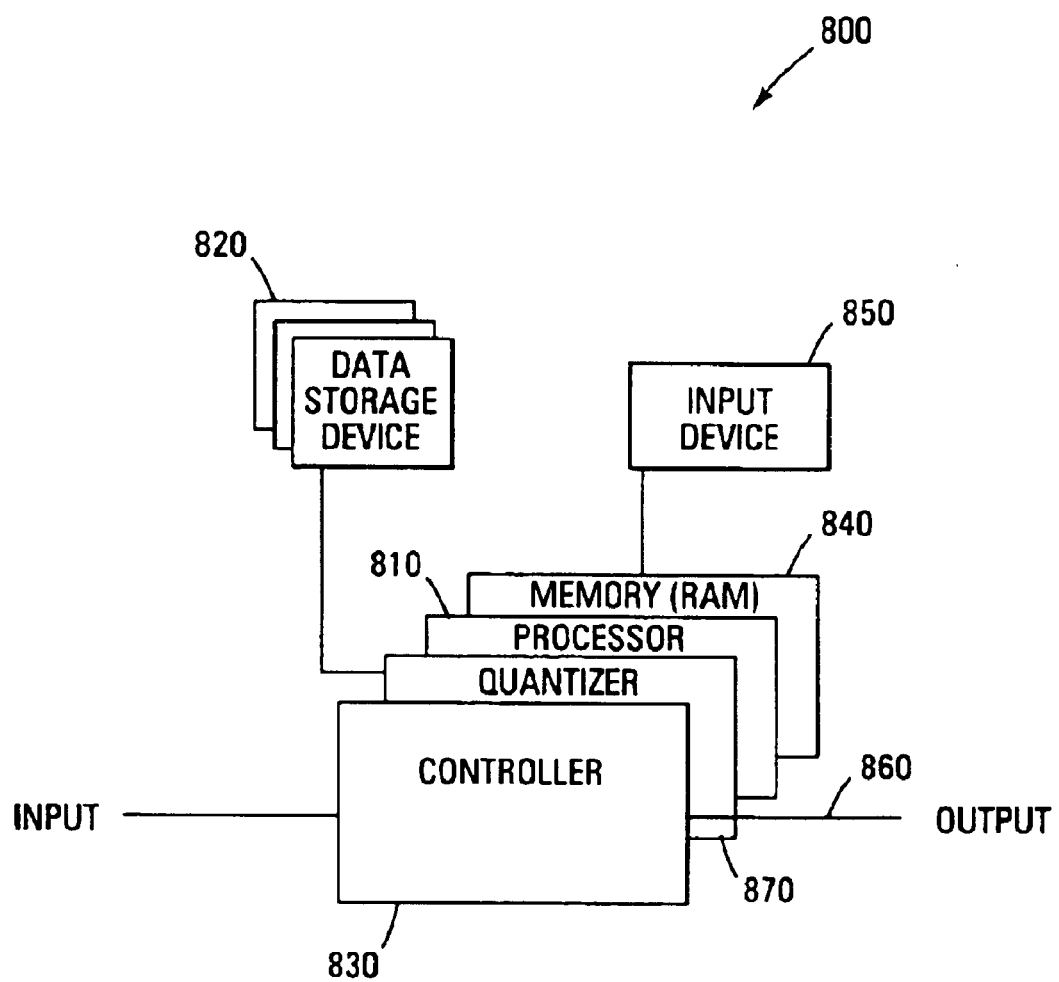
FIG. 8 illustrates another hardware environment for maintaining cache coherency in a storage system according to one embodiment of the present invention.

Referring to FIG. 8, another hardware environment 800 for maintaining cache coherency in a storage system is shown according to one embodiment of the present invention. The present invention may be implemented using a controller system (controller) 830, comprised of a processor 810 and memory (RAM) 840. For example, controller system 830 may be a RAID controller system. It is envisioned that attached to the controller 830 may be a memory device 840. Also included in this embodiment may be additional input devices 850, for downloading data and commands.

The controller 830 may operate under the control of an operating system. The controller 830 executes one or more computer programs under the control of the operating system. Generally, the operating system and the detector programs may be tangibly embodied in a computer-readable medium or carrier, e.g. one or more of the fixed or removable data storage devices 820, or other data storage or data communications devices. A quantizer 870 may be used for conversion of the analog signals to digital signals between the offset cancelled integrator 830 and any connecting digital devices. Both operating system and the computer programs may be loaded from the data storage devices into the memory 840 of the controller 830 for execution by the processor 810. The memory 840 is optional, or may be a memory device embedded or otherwise couple to the controller 830. Both the operating system and the controller programs comprise instructions which, when read and executed by the processor 810, cause the detector to perform the steps necessary to execute the steps or elements of the present invention.

Although one controller configuration is illustrated in FIG. 8, any number of different configurations performing similar functions may be used in accordance with the present invention.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for maintaining cache coherency in a system having a first controller and a second controller, comprising:

selecting a mirror cache line in a second controller to copy data into;

mirroring the data from a cache line in a first controller to the mirror cache line in the second controller;

sending a message from the first controller to the second controller informing the second controller of cache meta data associated with data in the mirror cache line;

sending a message from the first controller to the second controller requesting ownership of a cache line owned by the second controller;

managing a free list of mirror locations in the second controller's cache by the first controller, and managing a free list of mirror locations in the first controller's cache by the second controller, wherein the first and second controllers can copy data into the second and first controller's mirror locations, respectively, and granting ownership of a cache line owned by the second controller, to the first controller, wherein, subsequent to the first controller receiving data that is to be mirrored to the second controller cache line, transferring data to the second controller's cache line from the first controller.

2. The method of claim 1, wherein the first controller has information about the content of the second controller's cache, and the second controller has information about the content of the first controller's cache.

3. The method of claim 1, wherein the cache meta data includes a logical unit number, a logical block number, a dirty bit map, and a cache identifier for the data associated with the mirror cache line.

4. The method of claim 1 further comprising placing the address of the mirror cache line into a hash table of the first controller.

5. The method of claim 1 further comprising placing an address of the mirror cache line into a write back queue of the first controller.

6. The method of claim 1, further comprising sending a message to the second controller and providing the second controller with cache meta data associated with the mirror cache line.

7. The method of claim 1, further comprising switching ownership of cache lines between the first controller and the second controller.

8. The method of claim 1, further comprising, during failback, transferring cache lines from a survivor controller that owns a substantial number of mirror cache lines, to a replacement controller unit.

9. The method of claim 1, further comprising, sending a message to a controller of a mirror cache line, informing the controller that the associated cache line will be flushed and the data associated with the minor cache line will be temporarily invalid.

10. The method of claim 9, wherein sending the message to the controller of the mirror cache line further comprises informing the controller that after the associated cache line is flushed and the mirror cache line's data is consistent with a backing disk and need not be written to the backing disk in the event of a failover.

11. The method of claim 1, further comprising indicating to the first and second controllers that a cache line that has been flushed of data is available for reuse.

12. A controller system for maintaining cache coherency, comprising:

a disk array, a first controller, coupled to the disk array, for selecting a mirror cache line on a second controller; and an interface for mirroring the data from a first controller cache line to the second controller cache line;

wherein the first controller manages a free list of mirror locations in the second controller's cache, and the second controller manages a free list of mirror locations in the first controller's cache, the first and the second controller copying data into the second and the first controller mirror locations, respectively; and wherein a message is sent from the first controller to the second controller informing the second controller about cache meta data associated with data in the mirror cache line, a message is sent to the second controller, requesting ownership of a cache line owned by the second controller, and the second controller sends a message granting ownership of a cache line owned by the second controller, to the first controller, wherein, subsequent to the first controller receiving data that is to be mirrored to the second controller cache line, transferring that data to the second controller's cache line from the first controller.

13. The controller system of claim 12 wherein the first controller has information about the content of the second controller's cache, and the second controller has information about the content of the first controller's cache.

14. The controller system of claim 12, wherein the cache meta data includes a logical unit number, a logical block number, a dirty bit map, and a cache identifier associated with the mirror cache line.

15. The controller system of claim 12 further comprising the first controller placing an address of the mirror cache line into a hash table of the first controller.

16. The controller system of claim 12 further comprising the first controller placing an address of the mirror cache line into a write back queue of the first controller.

17. The controller system of claim 12, further comprising the first controller sending a message to the second controller informing the second controller of cache meta data associated with data in the mirror cache line.

18. The controller system of claim 12, wherein the first and second controllers switch ownership of cache lines.

19. The controller system of claim 12, further comprising, during failback, a survivor controller that owns a substantial number of mirror cache lines transfers associated cache lines to a replacement controller unit.

20. The controller system of claim 12, wherein a message is sent to a controller of a mirror cache line, informing the controller that the associated cache line will be flushed and the data associated with the mirror cache line will be temporarily invalid.

21. The controller system of claim 20, wherein the message that is sent to the controller of the mirror cache line further comprises informing the controller that after the associated cache line is flushed, the mirror cache line's data is consistent with a backing disk and need not be written to the backing disk in the event of a failover.

22. The controller system of claim 12, further comprising indicating to the first and second controllers that a cache line that has been flushed of data is available for reuse.

* * * * *